(12) United States Patent
Hayashi et al.

(10) Patent No.: US 7,691,764 B2
(45) Date of Patent: Apr. 6, 2010

(54) TRANSLUCENT CERAMIC, OPTICAL COMPONENT, AND OPTICAL DEVICE

(75) Inventors: Takeshi Hayashi, Moriyama (JP); Yuji Kintaka, Omihachiman (JP)

(73) Assignee: Murata Manufacturing Co., Ltd. (JP)

(*) Notice: Subject to any disclaimer, the term of this patent is extended or adjusted under 35 U.S.C. 154(b) by 0 days.

(21) Appl. No.: 12/323,777

(22) Filed: Nov. 26, 2008

(65) Prior Publication Data

US 2009/0075810 A1 Mar. 19, 2009

Related U.S. Application Data

(63) Continuation of application No. PCT/JP2007/060863, filed on May 29, 2007.

(30) Foreign Application Priority Data

Jun. 21, 2006 (JP) ............... 2006-171600

(51) Int. Cl.
C04B 35/00 (2006.01)
C04B 35/50 (2006.01)
C04B 35/51 (2006.01)
C01F 17/00 (2006.01)

(52) U.S. Cl. ............... 501/127; 501/152; 501/153; 423/263

(58) Field of Classification Search ............... 501/152, 501/153, 127; 423/263
See application file for complete search history.

(56) References Cited

U.S. PATENT DOCUMENTS 6,680,568 B2 * 1/2004 Fujiwara et al. ............. 313/501

2004/0222435 A1 * 11/2004 Shimizu et al. ............. 257/100
2005/0019241 A1 * 1/2005 Lyons ............. 423/263
2005/0215419 A1 * 9/2005 Takagimi et al. ............. 501/152

FOREIGN PATENT DOCUMENTS

| JP | 6107456 | 4/1994 |
|---|---|---|
| JP | 6135800 | 5/1994 |
| JP | 7-82025 | 3/1995 |
| JP | 2000-203933 | 7/2000 |
| JP | 2004-091269 | 3/2004 |
| JP | 2004075512 | 3/2004 |
| WO | WO-2004/067474 | 8/2004 |

OTHER PUBLICATIONS

Zrzecka et al. Yag powder synthesis by the modified citrate process. Journal of the European Ceramic Society 27 (2007) p. 593-597.*
International Search Report for PCT/JP2007/060863 dated Jun. 26, 2007.

* cited by examiner

*Primary Examiner*—Karl E Group
*Assistant Examiner*—Noah S Wiese
(74) *Attorney, Agent, or Firm*—Dickstein, Shapiro, LLP.

(57) ABSTRACT

Provided is a translucent ceramic which has a high Abbe number, is advantageous in aberration correction, and can be easily produced. The translucent ceramic contains, as a main component, a garnet type compound represented by the General Formula: $Y_3Al_vO_w$, wherein the condition of $4.4 \leq v \leq 5.4$ is satisfied and w is a positive number for maintaining electrical neutrality, in which the Al is partially or entirely substituted by Ga and the Y is optionally partly substituted by Gd. The translucent ceramic is suitably used, for example, for lenses arranged with a diaphragm interposed therebetween in a Gauss lens optical system, such as an optical system for single-lens reflex cameras.

20 Claims, 4 Drawing Sheets

10

11

12

13

14

TRANSLUCENT CERAMIC, OPTICAL COMPONENT, AND OPTICAL DEVICE

This is a continuation of application Serial No. PCT/JP2007/060863, filed May 29, 2008.

TECHNICAL FIELD

The present invention relates to a translucent ceramic useful as a material for optical components such as lenses, and an optical component and an optical device using the same.

BACKGROUND ART

Conventionally, optical components, such as lenses, mounted in optical devices have been formed of a glass, plastic, single crystal, or ceramic.

In recent years, optical materials with a high Abbe number have been demanded. An optical material with a high Abbe number is advantageous in terms of chromatic aberration correction or spherical aberration correction, when used particularly as a lens material for an imaging optical instrument handling a wide wavelength range of visible light, e.g., an imaging optical instrument, such as a camera or a video camera.

As a common optical material, a single crystal containing yttrium-aluminum-garnet (hereinafter referred to as "YAG") is known from Patent Document 1.

However, since a single crystal has the problems of high manufacturing cost and low productivity, an optical material containing a ceramic (hereinafter "polycrystal" material is referred to as "ceramic") has been desired.

Patent Document 2 discloses a translucent ceramic containing a Ba(Mg, Ta)O$_3$ perovskite as a main component. In such a material, optical properties, such as a refractive index and an Abbe number, can be changed by substituting a part of Mg and/or Ta with Sn and/or Zr. However, the Abbe number of such a material, is also insufficient.

Then, an attempt has been made to produce an optical material containing YAG with a high Abbe number using a ceramic, and is disclosed in Patent Document 3.

However, the YAG ceramic disclosed in Patent Document 3 requires calcination in vacuum or calcination in a reducing atmosphere to obtain translucency. Therefore, the YAG ceramic disclosed in Patent Document 3 has problems in that the manufacturing cost is high and it is difficult to obtain stable properties.

Moreover, the YAG ceramic disclosed in Patent Document 3 has problems in that optical properties, such as an Abbe number and a refractive index, are difficult to adjust in a wide range, resulting in reduced degree of freedom in design of an optical component or an optical device.

Patent Document 1: Japanese Unexamined Patent Application Publication No. 6-135800

Patent Document 2: Japanese Unexamined Patent Application Publication No. 2004-75512

Patent Document 3: Japanese Unexamined Patent Application Publication No. 6-107456

DISCLOSURE OF INVENTION

Problems to be Solved by the Invention

The present invention has been made in view of the above circumstances, and an object of the invention is to provide a translucent ceramic having a high Abbe number, a low manufacturing cost, and stable optical properties.

Another object of the present invention is to provide an optical component obtained using the above-described translucent ceramic and an optical device using the optical component.

Means for Solving the Problems

The translucent ceramic according to the present invention contains, as a main component, a garnet type compound represented by General Formula: $Y_3Al_vO_w$ ($4.4 \leq v \leq 5.4$ and w being a positive number for maintaining electrical neutrality), in which the Al is partially or entirely substituted by Ga.

In the translucent ceramic according to the present invention, the main component containing the garnet type compound before Ga substitution may be $(Y, Gd)_3Al_vO_w$ ($4.4 \leq v \leq 5.4$, w being a positive number for maintaining electrical neutrality, and Y being always contained).

The substitution amount of Al by Ga is preferably from 30 to 90 mol %.

In the translucent ceramic according to the present invention, the linear transmittance at a sample thickness of 0.4 mm of visible light having a wavelength of 633 nm (unless otherwise specified, simply referred to as "linear transmittance") is preferably 20% or more.

The present invention is also directed to an optical component containing the translucent ceramic described above and an optical device provided with the optical component.

Advantages

The translucent ceramic according to the present invention has an Abbe number as high as 35 or more. Thus, the translucent ceramic according to the present invention is advantageous in chromatic aberration correction or spherical aberration correction when used particularly as a lens material for an imaging optical instrument handling a wide wavelength range of visible light, e.g., an imaging optical instrument, such as a camera and a video camera.

Moreover, sinterability of the translucent ceramic according to the present invention is increased due to Ga substitution, and the firing atmosphere does not need to be a vacuum or a reducing atmosphere, which eliminates the necessity of a complicated manufacturing process. Therefore, the manufacturing cost can be reduced and also optical properties can be stabilized.

Further, the Abbe number and the refractive index can be sharply changed due to the composition modification of the translucent ceramic of the present invention, such as Ga substitution and/or Gd substitution. Therefore, the degree of freedom in design of an optical component or an optical device can be increased.

DESCRIPTION OF REFERENCE NUMERALS

Figure 1:
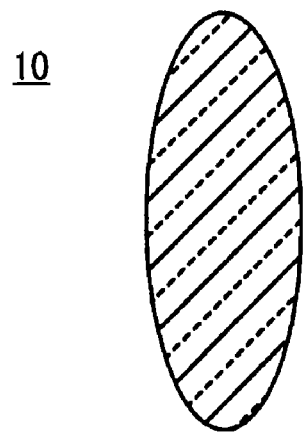
FIG. 1 is a cross sectional view illustrating a biconvex lens 10 as a first example of an optical component formed using the translucent ceramic according to the present invention.
Figure 2:
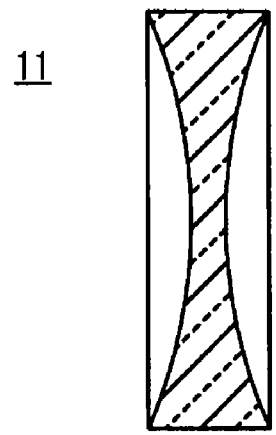
FIG. 2 is a cross sectional view illustrating a biconcave lens 11 as a second example of an optical component formed using the translucent ceramic according to the present invention.
Figure 3:
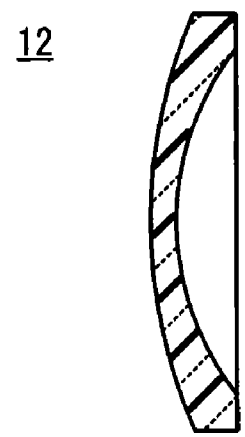
FIG. 3 is a cross sectional view illustrating a meniscus lens 12 as a third example of an optical component formed using the translucent ceramic according to the present invention.
Figure 4:
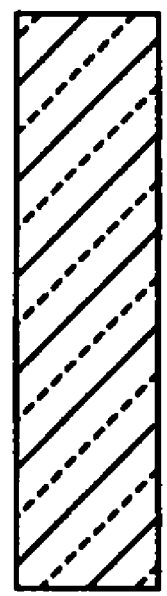
FIG. 4 is a cross sectional view illustrating an optical path length adjusting plate 13 as a fourth example of an optical component formed using the translucent ceramic according to the present invention.
Figure 5:
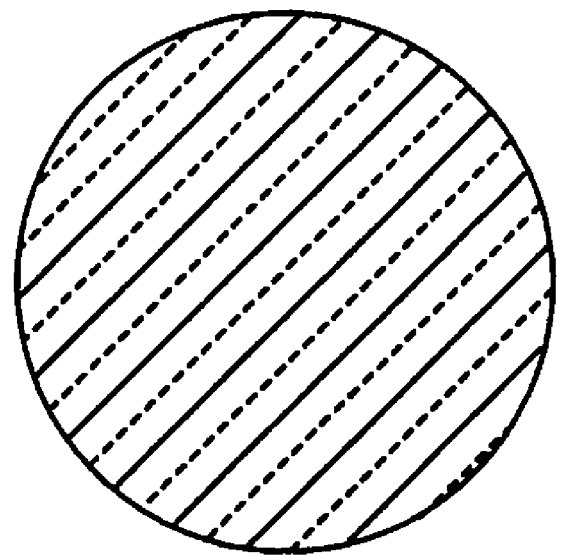
FIG. 5 is a cross sectional view illustrating a spherical lens 14 as a fifth example of an optical component formed using the translucent ceramic according to the present invention.

1 Recording medium
2 Objective lens
3 Half mirrors
4 Collimating lens
5 Semiconductor laser
6 Condenser lens
7 Light receiving element
8 Laser beam
9 Optical pickup
10 Biconvex lens
11 Biconcave lens
12 Meniscus lens
13 Optical path length adjusting plate
14 Spherical lens
20 Gauss lens optical system
21 to 27 Lens

BEST MODES FOR CARRYING OUT THE INVENTION

A translucent ceramic according to the present invention has a main crystal phase with a garnet structure represented by $Y_3Al_vO_w$, and a nominal molar ratio of Y site element: Al site element: oxygen of approximately 3:5:12. In order to obtain a linear transmittance of 20% or more, the range of v needs to be 4.4 to 5.4.

The translucent ceramic according to the present invention has the feature that the Al site is partially or entirely substituted by Ga. Due to the Ga substitution, the sinterability of a YAG ceramic are increased. Therefore, firing does not need to be performed under a specific atmosphere, such as a vacuum atmosphere or a reducing atmosphere by hydrogen introduction. More specifically, firing may be performed in the air. Preferably, firing is performed under an atmosphere having an oxygen partial pressure of 90% or more.

Moreover, the Abbe number and the refractive index are sharply changed due to the Ga substitution. With an increase in the Ga substitution amount, the Abbe number decreases. However, the Abbe number is still 35 or more, and thus there arise no problems in practical use. However, the Abbe number decrease, and in return, the refractive index increase promotes miniaturization of an optical component.

When the Ga substitution amount is within the range of 30 to 90 mol %, sinterability are particularly increased, which makes it possible to achieve a linear transmittance as high as 50% or more.

Further, in the translucent ceramic according to the present invention, it is also preferable that the Y site be partially substituted by Gd. Due to the Gd substitution, the Abbe number and the refractive index are further changed. With an increase in the Gd substitution for Y amount, the Abbe number decreases. However, the Abbe number is still 35 or more, and thus there arise no problems in practical use. The Abbe number decreases, however, and in return, the refractive index increases, which promotes miniaturization of an optical component.

Moreover, the translucent ceramic according to the present invention may contain impurities which may be inevitably intermixed during the manufacturing, insofar as the objects of the present invention are not impaired. Examples of impurities contained in oxides or carbonates used as a raw material or impurities mixed during a production process include $Fe_2O_3$, $B_2O_3$, $WO_3$, $Bi_2O_3$, $Sb_2O_5$, $P_2O_5$, CuO, and oxides of rare earth elements.

Next, an example of a method of producing the translucent ceramic according to the present invention will be described.

First, raw materials, such as oxides of each of elements Y, Al, Ga, and Gd are prepared. Then, a given amount of each raw material is weighed, and the weighed raw materials are mixed and calcined, thereby obtaining a ceramic material powder. The raw materials are not limited to oxides, and may be hydroxides and carbonates. Methods of producing a ceramic material powder are not limited to such a solid phase process. However, since the sinterability of the translucent ceramic according to the present invention are increased due to Ga substitution, it is not necessary to use a wet process requiring a high manufacturing cost.

In order to produce a translucent ceramic, an pre-fired ceramic green compact obtained by forming ceramic material powder into a given shape is prepared, and then the ceramic green compact is fired. The firing atmosphere does not need to be a reduced-pressure atmosphere or a pressurized atmosphere, such as a vacuum atmosphere or HIP (Hot Isostatic Press). The firing may be performed in the air at normal pressure. In order to increase translucency, the oxygen concentration is preferably adjusted to 90% or more.

When a ceramic green compact is fired, it is preferable to bring the ceramic green compact into contact with a composition for simultaneous ceramic whose composition is substantially the same as that of the ceramic raw material powder from the viewpoint of achieving further increased translucency. The composition for simultaneous ceramic is powder obtained by, for example, calcinating a raw material whose composition is adjusted in such a manner as to be the same as that of the ceramic green compact, and then pulverizing the resultant calcine. With the composition for simultaneous ceramic, a volatile component in the ceramic green compact is prevented from volatilizing at the time of calcination. Therefore, it is preferable that the firing process be carried out in a state where an ceramic green compact is embedded in powder of the composition for simultaneous ceramic. The composition for simultaneous ceramic is not limited to powder, and may be a green compact or a sintered body.

It should be noted that it is preferable that the composition for simultaneous ceramic have the same composition as the ceramic material powder for the ceramic green compact. However, the composition for simultaneous ceramic may have substantially the same composition. The description that the composition for simultaneous ceramic has substantially the same composition as the ceramic raw material powder for an ceramic green compact means that the composition for simultaneous ceramic is an equivalent composition containing the same composition element. The composition for simultaneous ceramic does not need to have exactly the same composition ratio. Moreover, the composition for simultaneous ceramic does not necessarily have a composition capable of giving translucency.

The translucent ceramic according to the present invention can be used for optical components, such as lenses, and can be utilized for, for example, a biconvex lens 10, a biconcave lens 11, a meniscus lens 12, an optical path length adjusting plate 13, and a spherical lens 14, illustrated in FIGS. 1 to 5, respectively.

Moreover, an optical device provided with such an optical component will be described with reference to an optical pickup. Among optical pickups, there is an optical pickup that handles a plurality of light beams having different wavelengths with one optical system, and an optical material with a high Abbe number may be demanded.

Figure 6:
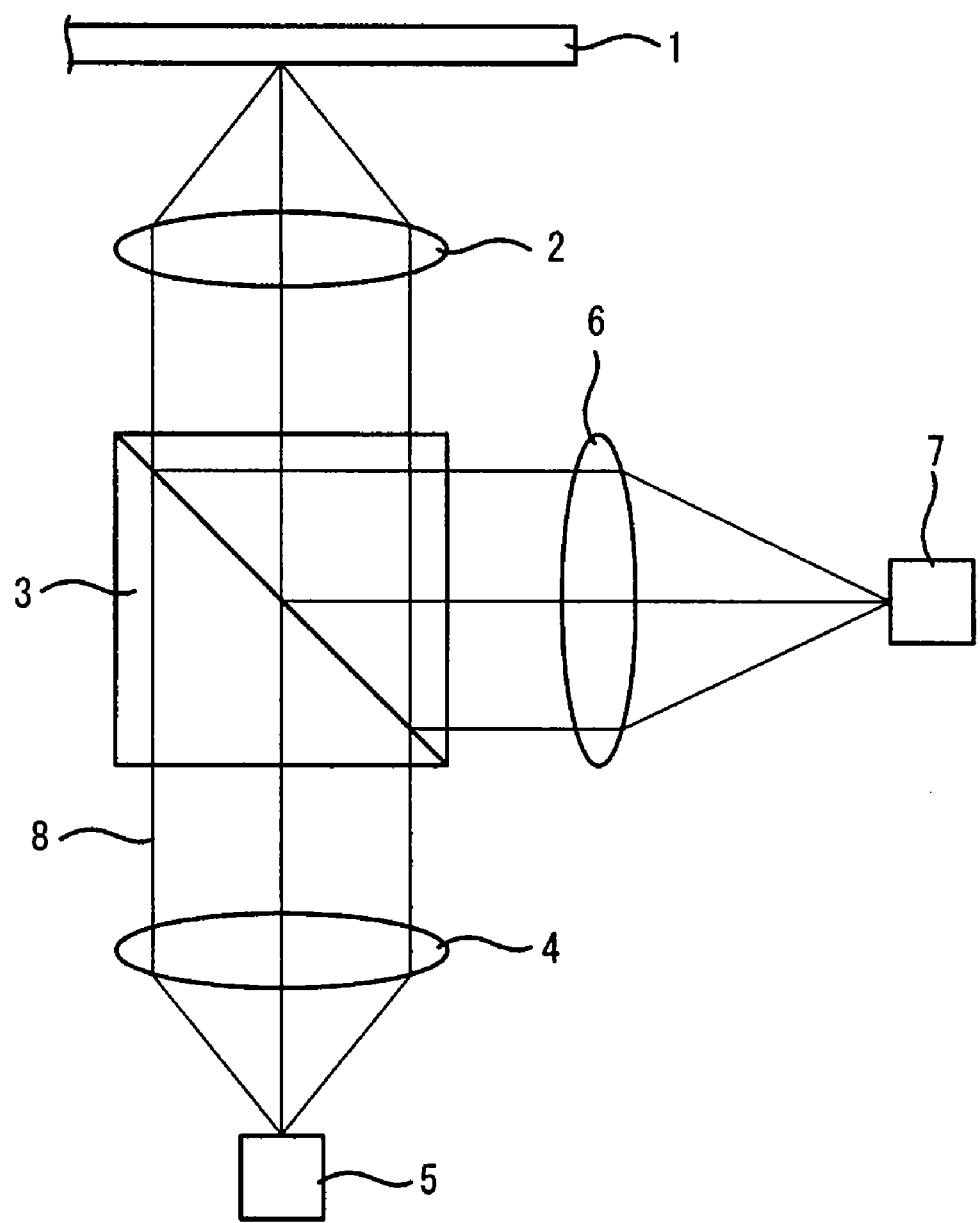
FIG. 6 is a front elevation view schematically illustrating an optical pickup 9 as an example of an optical device provided with an optical component formed using the translucent ceramic according to the present invention.

As shown in FIG. 6, an optical pickup 9 emits a laser beam 8, which is coherent light, to a recording medium 1, such as a compact disc or a minidisc, and reproduces information recorded on the recording medium 1 from the reflected light.

Such an optical pickup 9 is provided with a collimating lens 4, which converts the laser beam 8 from a semiconductor laser 5 serving as a light source to parallel light, and a half mirror 3 on the light path of the parallel light. The half mirror 3 transmits incident light from the collimating lens 4 to cause the light to travel in a straight line. The travel direction of the reflected light from the recording medium 1 is changed by, for example, about 90° by reflection.

Moreover, the optical pickup 9 is provided with an objective lens 2 for condensing the incident light from the half mirror 3 onto the recording side of the recording medium 1. The objective lens 2 is intended to efficiently transmit the reflected light from the recording medium 1 toward the half mirror 3. In the half mirror 3 through which the reflected light enters, the phase is changed by the reflection to thereby change the travel direction of the reflected light.

The optical pickup 9 is further provided with a condenser lens 6 for condensing the reflected light whose travel direction has been changed. At a position for condensing the reflected light, a light receiving element 7 for reproducing information from the reflected light is provided.

In the optical pickup 9 thus structured, the translucent ceramic according to the present invention can be advantageously used as a raw material for each of the objective lens 2, the half mirror 3, the collimating lens 4, and the condenser lens 6, for example.

Further, as another example of the optical device, an optical system for single-lens reflex cameras will be described.

Figure 7:
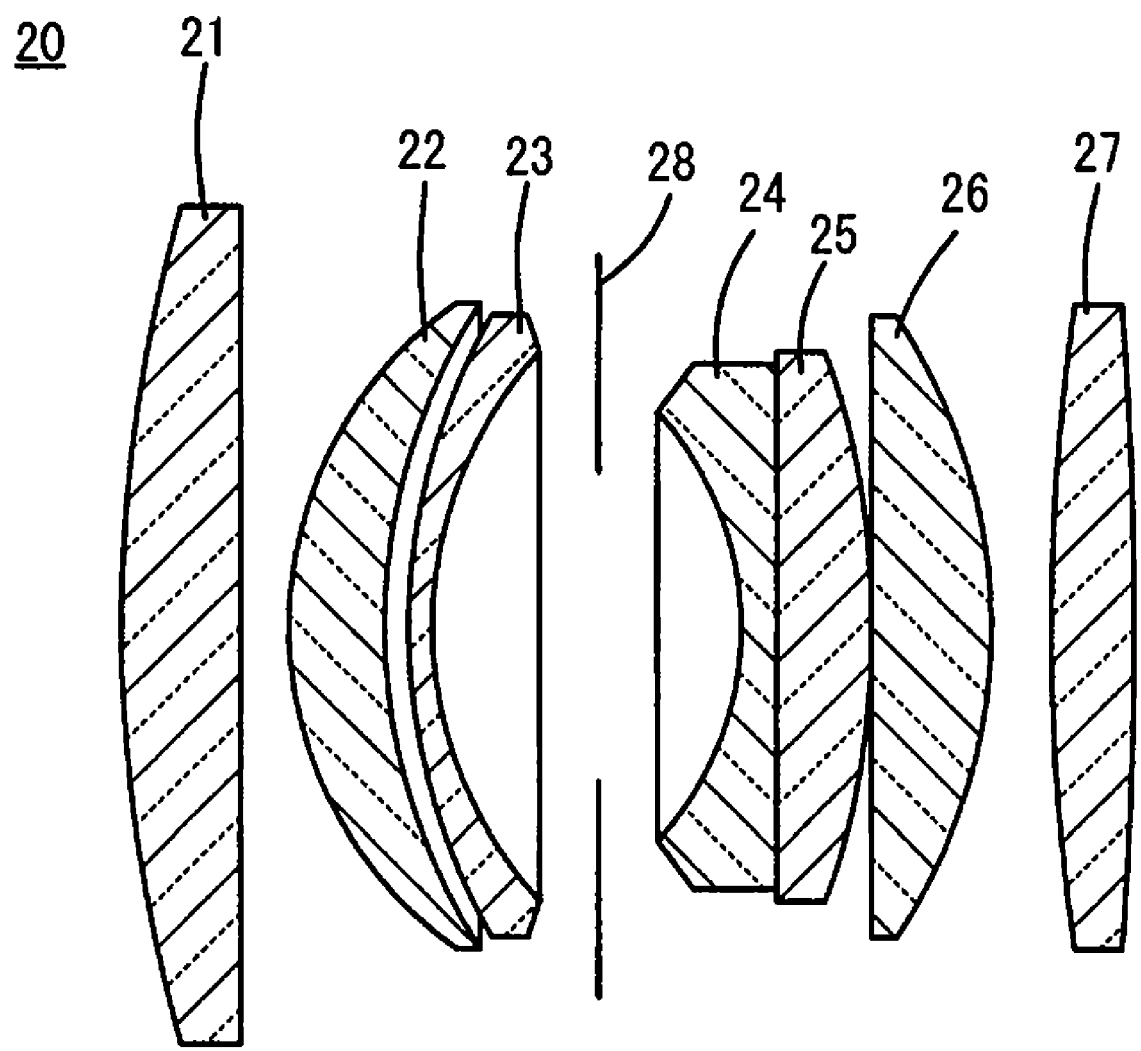
FIG. 7 is a side view schematically illustrating a gauss lens optical system 20 as an example of an optical device provided with an optical component formed using the translucent ceramic according to the present invention.

As shown in FIG. 7, a Gauss lens optical system 20 which is widely used as an optical system for single-lens reflex cameras is formed of seven lenses 21 to 27. When the translucent ceramic having a high Abbe number according to the present invention is used for a lens 22 and a lens 25 which are mutually arranged with a diaphragm 28 interposed therebetween, chromatic aberration correction can be accurately performed.

EXPERIMENTAL EXAMPLES

Next, the translucent ceramic according to the present invention will be described with reference to Experimental Examples.

As a raw material, powder of each of $Y_2O_3$, $Al_2O_3$, $Ga_2O_3$, and $Gd_2O_3$ each having a high purity was prepared. Then, each raw material powder was weighed, and wet-mixed for 20 minutes in a ball mill in such a manner that each sample shown in Table 1, which is represented by Composition Formula: $(Y_{1-x}Gd_x)_3(Al_{1-y}Ga_y)_vO_w$ (w being a positive number for maintaining electrical neutrality), is obtained. The mixture was dried, and calcined at 1,300° C. for 3 hours to obtain calcined powder.

Next, the calcined powder was put in a ball mill together with water and an organic binder, and then wet-ground for 16 hours. As the organic binder, ethyl cellulose was used.

Next, the ground material was dried, and then granulated through a 50 mesh net (sieve). Then, the obtained powder was pressed at a pressure of 196 MPa for press forming. Thus, a disc-shaped ceramic green compact formed body having a diameter of 30 mm and a thickness of 2 mm was obtained.

Next, the ceramic green compact was embedded in powder having the same composition as that of ceramic material powder contained therein. The embedded ceramic green compact was put in a furnace, heated in atmospheric air, and subjected to de-binder treatment. Subsequently, oxygen was introduced in the furnace while increasing the temperature. When the temperature was within the maximum temperature range of 1575 to 1675° C., the oxygen concentration in the firing atmosphere was increased up to about 95 volume %. Here, the optimum maximum temperature was suitably selected according to material compositions. For example, the optimum temperature was 1,675° C. in the case of a sample number 7. Firing was performed for 20 hours while maintaining the firing temperature and the oxygen concentration to obtain a sintered body. It should be noted that the total pressure at the time of firing was adjusted to 1 atmosphere.

The sintered body thus obtained was evaluated for the structure by X-ray diffraction, which showed that the structure thereof was substantially a single phase of garnet structure. The sintered body was subjected to mirror surface finishing to form a disc-shaped sintered body having a thickness of 0.4 mm to be used as a sample of a translucent ceramic.

Each of the samples was measured for linear transmittance in a visible light region, more specifically, at a wavelength λ of 633 nm. The linear transmittance was measured using a spectrophotometer (UV-2500) manufactured by Shimadzu Corp.

Moreover, each of the samples was measured for refractive index. The refractive index was measured using a prism coupler (MODEL2010) manufactured by Metricon. The refractive index at 409 nm, 532 nm, and 833 nm wavelengths were measured with the prism coupler. Using the values of refractive indices of these three wavelengths, constants a, b, and c were calculated according to Relation Equation of a wavelength and a refractive index: Equation 1, thereby obtaining the relationship between wavelength and refractive index.

$$n = a/\lambda^4 + b/\lambda^2 + c \qquad \text{Equation 1}$$

(wherein n is a refractive index, λ is a wavelength, and a, b, and c are constants.)

Refractive indices at three wavelengths (F line: 486.13 nm, d line: 587.56 nm, C line: 656.27 nm), which are required for calculating the Abbe number ($v_d$), are obtained according to the equation. Thus, the Abbe number was calculated according to Definitional Equation of an Abbe number: Equation 2.

$$v_d = (n_d - 1)/(n_F - n_C) \qquad \text{Equation 2}$$

(wherein $n_d$, $n_F$, and $n_C$ represent the refractive index at a d line, an F line, and a C line, respectively).

The refractive index $n_d$, Abbe number $v_d$, and linear transmittance obtained as described above are shown in Table 1.

TABLE 1

| Sample No. | x | y | v | Refractive index $n_d$ | Abbe number $v_d$ | Linear transmittance (%) |
|---|---|---|---|---|---|---|
| *1 | 0.00 | 0.00 | 5.0 | 1.833 | 54.4 | 0.1 |
| 2 | 0.00 | 0.10 | 5.0 | 1.843 | 53.9 | 28.1 |
| 3 | 0.00 | 0.20 | 5.0 | 1.853 | 52.0 | 48.2 |
| 4 | 0.00 | 0.30 | 5.0 | 1.864 | 50.2 | 53.1 |
| 5 | 0.00 | 0.40 | 5.0 | 1.874 | 48.3 | 58.6 |
| 6 | 0.00 | 0.50 | 5.0 | 1.884 | 46.4 | 69.4 |
| 7 | 0.00 | 0.60 | 5.0 | 1.895 | 44.6 | 73.3 |
| 8 | 0.00 | 0.70 | 5.0 | 1.905 | 42.7 | 72.6 |
| 9 | 0.00 | 0.80 | 5.0 | 1.915 | 40.9 | 74.9 |
| 10 | 0.00 | 0.90 | 5.0 | 1.926 | 39.0 | 68.1 |
| 11 | 0.00 | 1.00 | 5.0 | 1.936 | 37.1 | 49.7 |
| 12 | 0.25 | 0.25 | 5.0 | 1.867 | 50.0 | 53.1 |
| 13 | 0.50 | 0.50 | 5.0 | 1.901 | 45.6 | 60.5 |
| *14 | 0.00 | 0.60 | 4.0 | 1.899 | 42.4 | 1.3 |
| *15 | 0.00 | 0.60 | 4.2 | 1.898 | 48.7 | 3.2 |
| 16 | 0.00 | 0.60 | 4.4 | 1.898 | 45.2 | 37.8 |
| 17 | 0.00 | 0.60 | 4.6 | 1.898 | 44.4 | 44.0 |
| 18 | 0.00 | 0.60 | 4.8 | 1.896 | 45.0 | 48.6 |
| 19 | 0.00 | 0.60 | 5.2 | 1.895 | 46.6 | 35.9 |
| 20 | 0.00 | 0.60 | 5.4 | 1.895 | 49.7 | 27.4 |
| *21 | 0.00 | 0.60 | 5.6 | 1.893 | 43.1 | 1.5 |
| *22 | 0.00 | 0.60 | 5.8 | 1.892 | 45.7 | 1.0 |
| *23 | 0.00 | 0.60 | 6.0 | 1.891 | 43.2 | 0.9 |

In Table 1, samples having a sample number with * are beyond the scope of the present invention.

According to the samples 2 to 13 and 16 to 20 within the scope of the present invention, the Abbe number $v_d$ was 35 or more as shown in Table 1. Moreover, sufficient translucency was achieved.

Particularly, in the samples 4 to 10 having the Ga substitution amount y within the range of 0.3 to 0.9 exhibited a linear transmittance as high as 50% or more.

In contrast thereto, in the sample 1 whose Ga substitution amount y is 0, sintering did not sufficiently progress. Thus, although the refractive index and the Abbe number were evaluated, translucency allowing practical use was not achieved.

Further, since the samples 14, 15, 21, 22, and 23, v is beyond the range of 4.4 to 5.4, a heterophase appears, resulting in failure in achieving translucency allowing practical use.

It should be noted that the sample 7 was measured for a refractive index at each of the TE mode and the TM mode at λ=587.56 nm (d line), and both refractive indices were 1.895. Thus, it is revealed that birefringence does not occur in view of the fact that the respective refractive indices at the TE mode and the TM mode are the same values.

The invention claimed is:

1. A translucent ceramic, comprising:
a body of sintered garnet type compound as a main component represented by the General Formula $(Y_{1-x}Gd_x)_3(Al_{1-y}Ga_y)_vO_w$, in which x is 0 to less than 1, y is 0.3 to 0.9, $4.4 \leq v \leq 5.4$, and w is a positive number for maintaining electrical neutrality.

2. The translucent ceramic according to claim 1, wherein x is 0.

3. The translucent ceramic according to claim 2, wherein $4.6 \leq v \leq 5.2$.

4. The translucent ceramic according to claim 1, wherein x is greater than 0.

5. The translucent ceramic according to claim 4, wherein $4.6 \leq v \leq 5.2$.

6. The translucent ceramic according to claim 5, wherein x is 0.25 to 0.5.

7. The translucent ceramic according to claim 6, wherein the linear transmittance at a sample thickness of 0.4 mm of visible light having a wavelength of 633 nm is 20% or more.

8. The translucent ceramic according to claim 4, wherein the linear transmittance at a sample thickness of 0.4 mm of visible light having a wavelength of 633 nm is 20% or more.

9. The translucent ceramic according to claim 2, wherein the linear transmittance at a sample thickness of 0.4 mm of visible light having a wavelength of 633 nm is 20% or more.

10. The translucent ceramic according to claim 1, wherein the linear transmittance at a sample thickness of 0.4 mm of visible light having a wavelength of 633 nm is 20% or more.

11. An optical component, comprising the translucent ceramic according to claim 1.

12. An optical device, comprising the optical component according to claim 11.

13. An optical component, comprising the translucent ceramic according to claim 2.

14. An optical device, comprising the optical component according to claim 13.

15. An optical component, comprising the translucent ceramic according to claim 4.

16. An optical device, comprising the optical component according to claim 15.

17. An optical component, comprising the translucent ceramic according to claim 6.

18. An optical device, comprising the optical component according to claim 17.

19. The translucent ceramic according to claim 5, wherein x is 0.25 to 0.5.

20. An optical component, comprising the translucent ceramic according to claim 19.

* * * * *